Jan. 8, 1935.  F. WINKLER ET AL  1,987,092
CONVERSION OF HYDROCARBONS
Filed May 13, 1931
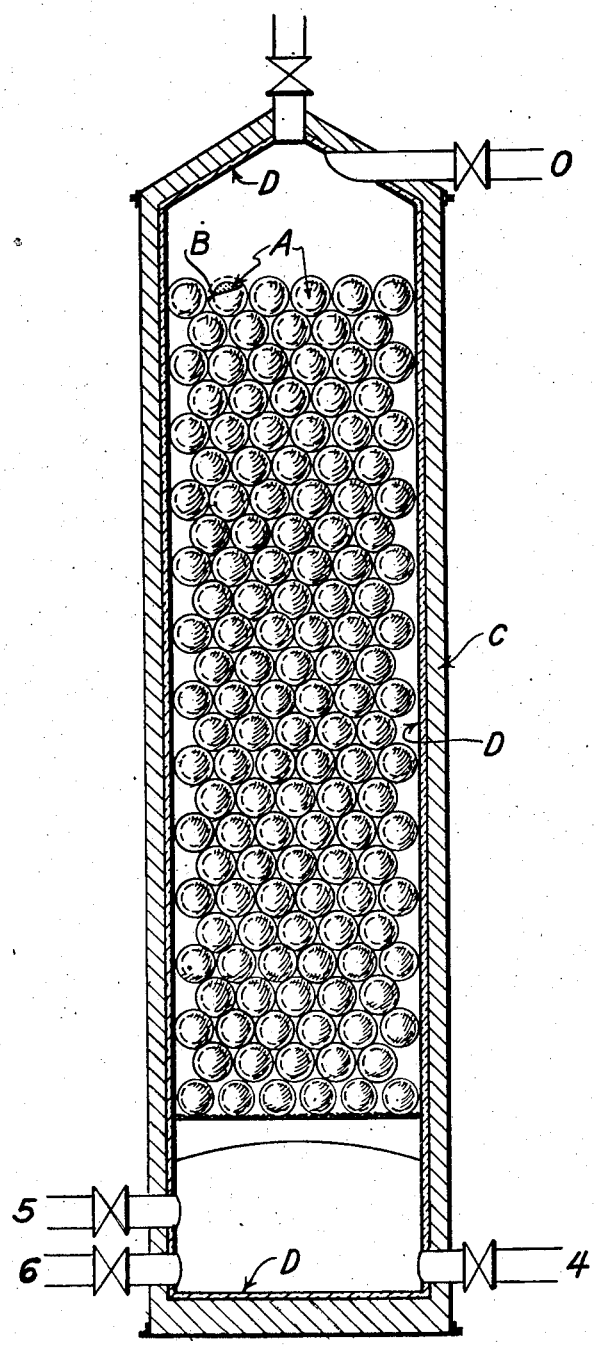
INVENTORS
FRITZ WINKLER
PAUL FEILER
HERMANN WEIGMANN
*Hauff + Warland*
ATTORNEYS Patented Jan. 8, 1935

1,987,092

UNITED STATES PATENT OFFICE 1,987,092

CONVERSION OF HYDROCARBONS

Fritz Winkler and Paul Feiler, Ludwigshafen-on-the-Rhine, and Hermann Weigmann, Mannheim, Germany, assignors to I. G. Farbenindustrie Aktiengesellschaft, Frankfort-on-the-Main, Germany Application May 13, 1931, Serial No. 537,206
In Germany May 21, 1930

5 Claims. (Cl. 196—10)

The present invention relates to the conversion of hydrocarbons by heat treatment.

When the conversion of gaseous hydrocarbons at temperatures above 500° C., as for example the conversion of methane and its homologues or olefines into other hydrocarbons, especially liquid hydrocarbons as for example benzene, is carried out in a continuous or interrupted operation, in vessels of ceramic material, as for example chamotte, which is cheap and excellent as regards heat technics, there is the objection that the material at the necessary temperatures catalytically favours the formation of carbon, whereby the yield of the desired conversion product, as for example benzene and the like, is reduced.

We have now found that the said objection is avoided and excellent yields of valuable hydrocarbons are obtained when the walls of the reaction chamber, especially when they consist of catalytically unfavourable refractory materials, such as chamotte, or refractory metals, for example chromium-nickel-steel, are provided on the inside partly or wholly with a coating of inorganic substances produced by fusion which expression hereinafter also comprises sintering. For example only those parts of the apparatus which are exposed to the temperatures at which the reaction occurs may be coated with said inorganic substances. As such substances come into question silicates, phosphates and borates of alkaline or alkaline earth metals or of copper, manganese, lead, chromium and the like may be employed. These are applied to the material in the cold either as such or in the form of their components and are then heated to such an extent that sintering or fusion takes place. In this manner lustrous coatings impermeable to gases are obtained which give no injurious formation of carbon black in the said processes even at temperatures above 1000° centigrade. Thus cheap refractory materials, such as chamotte or materials containing large amounts of silicon carbide, for example those known under the trade-mark "Karrellite" or "Stellacarbide", may be rendered useful for these reactions in a very advantageous manner.

Furthermore, it is advantageous in many cases to fill the reaction chamber wholly or partly with pieces of material, preferably refractory material, such as chamotte, which has likewise been provided with the said inorganic nonporous coatings produced by fusion or sintering. When working discontinuously (as for example in Cowper apparatus) the lining as well as the filling, which is preferably of ceramic material such as chamotte by reason of its high heat capacity and stability to heat, are preferably coated in the said manner. Catalytically active substances, as for example silicides or carbides, may be added to the coatings.

The nature of the invention will be further described with reference to the accompanying drawing which illustrates diagrammatically a vertical section of a heat chamber according to the invention but the invention is not restricted to the particular example shown.

The Cowper shown in the said drawing which is 6 meters in height and which has a free cross-section of 0.33 square meter is filled with bodies A of a heat resistant material, such as chamotte, which is lined with a glaze B. Similarly the walls C are internally lined with a glaze D, which may be made of the same substance as glaze B. For heating up the Cowper heating gases are introduced at 5, while air is supplied at 6. When the desired temperature is reached the supply of the heating gases and the air is shut off and the gaseous hydrocarbons to be converted are introduced at O. The converted gases and vapors are withdrawn at 4.

The following examples will further illustrate the nature of this invention but the invention is not restricted to these examples.

Example 1

Chamotte material is coated with a layer of sodium calcium silicate in the cold and then sintered and fused at about 1200° centigrade. This material is introduced into a chamotte tube 20 millimetres in internal diameter provided with an internal coating in the same way. 90 per cent methane is then led at ordinary pressure with a velocity of 25 litres per hour through this tube which is heated to 1050° centigrade over a length of 60 centimetres. A condensate is obtained by strongly cooling the vapours formed, and this consists mainly of benzene. The remaining gas has the composition:

1.8 per cent of $C_nH_{2n}$
37.6 per cent of $H_2$
54.0 per cent of $CH_4$
6.6 per cent of $N_2$ No injurious formation of carbon black can be observed after operation for long periods of time.

Example 2

A gas mixture containing 11.2 per cent of ethane, 39.5 per cent of propane and 37.8 per cent of butane is led at ordinary pressure at 850° centigrade and with a velocity of 10 litres per hour over the chamotte material treated as in Example 1 and situated in a chamotte tube similar to that employed in Example 1. 350 grams of a liquid consisting mainly of benzene are obtained from each cubic metre of gas.

The residual gas consists of:

2.6 per cent of higher olefines
27.6 per cent of $C_2H_4$
1.0 per cent of CO
24.2 per cent of $H_2$
39.6 per cent of $CH_4$
5.0 per cent of $N_2$ No injurious formation of carbon black can be observed even after operation for long periods of time.

Example 3

A cowper 6 metres in height is filled with chamotte plates having a total heating surface of 15 square metres, the inner wall of the Cowper as well as said plates being previously squirted with a paste of a mixture of feldspar, fluor spar and quartz and then heated to about 1400° centigrade, whereby vitrification is effected. 3.5 cubic metres of 85 per cent methane are then led within 6 minutes through the Cowper heated to 1100° centigrade. From each cubic metre of initial gas are obtained 45 grams of a condensate containing 55 per cent of benzene and 1.2 cubic metres of a gas having the following composition: 2.0 per cent of carbon dioxide, 2.2 per cent of olefines, 0.8 per cent of carbon monoxide, 32.0 per cent of hydrogen, 56.8 per cent of methane and 6.2 per cent of nitrogen.

Example 4

23 litres of a 90 per cent methane are passed per hour through a porcelain tube 15 millimetres in internal diameter which has been internally coated with a glaze of a lead silicate composed of 36 per cent of silicic acid, 36 per cent of lead oxide and 28 per cent of a mixture of silicates of sodium and potassium, and which is heated to 1050° centigrade within a length of 90 centimeters. By one passage of each cubic meter of methane 35 grams of a condensate consisting mainly of benzene are obtained. The final gas contains 66 per cent of unconverted methane and may be treated again. A clogging up of the tube by deposition of carbon does not take place even after operating for long periods of time.

Example 5

A melt of chromium silicate obtained from 2 parts of chromium oxide and 98 parts of glass powder is applied to and melted on the inner surface of a porcelain tube 15 millimeters in internal diameter. 23 litres of a 90 per cent methane are passed per hour through this tube while heating the same to a temperature of 1050° centigrade within a length of 90 centimeters. By one passage each cubic meter of methane yields 36 grams of a condensate consisting mainly of benzene. The final gas contains 65 per cent of unchanged methane and may be treated again. A clogging up of the tube by deposition of carbon does not take place even after operating for long periods of time.

Example 6

20 liters of a gas having the following composition:

4.3 per cent by volume of $C_4H_8$
23.0 per cent by volume of $C_4H_{10}$
8.0 per cent by volume of $C_3H_6$
56.2 per cent by volume of $C_3H_8$
0.5 per cent by volume of $C_2H_4$
7.5 per cent by volume of $C_2H_6$
0.5 per cent by volume of $N_2$ is passed per hour through a tube of chamotte, 15 millimeters in internal diameter, which is internally lined with a ceramic coating prepared by heating a mixture consisting of 80 grams of glass powder, 10 grams of borax and 3 grams of boron to a temperature of 1100° C. The said tube is heated to 800° C. within a length of 90 centimeters during the passage of the gas. From each cubic meter of initial gas 300 grams of a condensate consisting mainly of methane are thus obtained and in addition 2 cubic meters of a gas having the following composition:

29.4 per cent by volume of $C_nH_{2n}$
0.4 per cent by volume of CO
26.8 per cent by volume of $H_2$
43.2 per cent by volume of $CH_4$
0.2 per cent by volume of $N_2$ Even after working for 60 hours no injurious formation of soot could be observed.

Instead of borax sodium phosphate may be employed with the same success.

What we claim is:

1. In the conversion of a gaseous hydrocarbon into olefines and aromatic hydrocarbons at a temperature above 500° C., the step which comprises contacting said hydrocarbon with a glaze, on a refractory material comprising a substance selected from the group consisting of the silicides, the carbides and chamotte, of an inorganic substance selected from the group consisting of the silicates, phosphates and borates of copper, manganese, lead and chromium.

2. In the conversion of a gaseous hydrocarbon into olefines and aromatic hydrocarbons at a temperature above 500° C., the step which comprises contacting said hydrocarbon with a glaze, on chamotte, of an inorganic substance selected from the group consisting of the silicates, phosphates and borates of copper, manganese, lead and chromium.

3. In the conversion of a gaseous hydrocarbon into olefines and aromatic hydrocarbons at a temperature above 500° C., the step which comprises contacting said hydrocarbon with a glaze, on a refractory material comprising silicon carbide, of an inorganic substance selected from the group consisting of the silicates, phosphates and borates of copper, manganese, lead and chromium.

4. In the production of liquid hydrocarbons by heating methane to a temperature above 900° C., the step which comprises contacting said methane with a glaze, on a refractory material comprising a substance selected from the group consisting of the silicides, the carbides and chamotte, of an inorganic substance selected from the group consisting of the silicates, phosphates and borates of copper, manganese, lead and chromium.

5. A furnace the lining and the filling of which, consisting of a refractory material comprising a substance selected from the group consisting of the silicides, the carbides and chamotte, is coated with a glaze comprising an inorganic substance selected from the group consisting of the silicates, phosphates and borates of copper, manganese, lead and chromium.

FRITZ WINKLER.
PAUL FEILER.
HERMANN WEIGMANN.